United States Patent
Billig et al.

(10) Patent No.: US 9,003,977 B2
(45) Date of Patent: Apr. 14, 2015

(54) VEHICLE SYSTEM AND METHOD

(75) Inventors: Ronald Gene Billig, Hermitage, PA (US); Taral Shah, Wattsbury, PA (US)

(73) Assignee: General Electric Company, Schenectady, NY (US)

(*) Notice: Subject to any disclaimer, the term of this patent is extended or adjusted under 35 U.S.C. 154(b) by 188 days.

(21) Appl. No.: 13/601,143

(22) Filed: Aug. 31, 2012

(65) Prior Publication Data

US 2014/0060377 A1    Mar. 6, 2014

(51) Int. Cl.
*B61C 5/00* (2006.01)
*B61C 17/02* (2006.01)
*B61C 17/12* (2006.01)
*B61C 17/04* (2006.01)

(52) U.S. Cl.
CPC . *B61C 5/00* (2013.01); *B61C 17/02* (2013.01); *B61C 17/12* (2013.01); *B61C 17/04* (2013.01); *Y02T 30/10* (2013.01)

(58) Field of Classification Search
USPC ............ 105/62.1, 1.4, 26.05, 26.1, 62.2
See application file for complete search history.

(56) References Cited

U.S. PATENT DOCUMENTS

| | | | |
|---|---|---|---|
| 7,565,867 B2* | 7/2009 | Donnelly et al. | 105/62.1 |
| 2003/0233959 A1* | 12/2003 | Kumar | 105/26.05 |
| 2006/0005739 A1* | 1/2006 | Kumar | 105/35 |
| 2008/0110181 A1* | 5/2008 | Werner | 62/48.1 |
| 2008/0302093 A1* | 12/2008 | Montgomery et al. | 60/299 |
| 2011/0067390 A1* | 3/2011 | Cook | 60/320 |
| 2014/0033738 A1* | 2/2014 | Billig et al. | 62/48.1 |
| 2014/0033946 A1* | 2/2014 | Billig et al. | 105/35 |
| 2014/0060377 A1* | 3/2014 | Billig et al. | 105/1.4 |
| 2014/0116062 A1* | 5/2014 | Hartono | 60/772 |

* cited by examiner

*Primary Examiner* — Jason C Smith
(74) *Attorney, Agent, or Firm* — GE Global Patent Operation; John A. Kramer

(57) ABSTRACT

Various methods and systems are provided for a rail vehicle. In one example, a rail vehicle includes a first engine positioned in a central location of the rail vehicle, the first engine configured to combust at least one of a first fuel or a second fuel. The rail vehicle further includes a fuel tank positioned in place of an operator cab, the fuel tank configured to store the second fuel.

12 Claims, 3 Drawing Sheets

VEHICLE SYSTEM AND METHOD

FIELD

Embodiments of the subject matter disclosed herein relate to rail vehicles including rail vehicles in a consist. Other embodiments relate to fuel systems in the rail vehicles.

BACKGROUND

Consists may include one or more rail vehicles and one or more freight cars. Each rail vehicle may include an engine and, in some examples, the engine may be a dual fuel engine which combusts fuel such as diesel, and liquefied natural gas (LNG) or compressed natural gas (CNG). In some examples, a tender car may be included in the consist to carry one of the fuels, such as LNG or CNG, to be supplied to the one or more rail vehicles. In order to include the tender car in the consist, however, a freight car may have to be removed. Removal of a freight car may result in revenue loss, for example. In some cases, the revenue loss may exceed fuel cost savings resulting from using LNG or CNG instead of or in addition to diesel.

BRIEF DESCRIPTION

Thus, in one embodiment, a rail vehicle includes a first engine positioned in a central location of the rail vehicle, where the first engine is configured to combust at least one of a first fuel or a second fuel. The rail vehicle further includes a fuel tank positioned in place of an operator cab. The fuel tank is configured to store the second fuel.

In such an example, the rail vehicle does not include an operator cab. Instead, the fuel tank is disposed in a position typically occupied by the operator cab. As such, a rail vehicle which may already be part of a consist may operate as a tender car without replacing a freight car. In this way, the freight carrying/revenue generating capacity of the consist may be maintained.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for a rail vehicle which may be positioned in a consist. In one example, a rail vehicle comprises a first engine positioned in a central location of the rail vehicle, the first engine configured to combust at least one of a first fuel or a second fuel. The rail vehicle further comprises a fuel tank positioned in place of an operator cab, the fuel tank configured to store the second fuel. In such an example, the rail vehicle does not include an operator cab, and the fuel tank is disposed in a position where an operator cab is located in other rail vehicles. Further, the second fuel stored in the fuel tank may be supplied to the engine in the rail vehicle or to an engine in an adjacent rail vehicle, for example. In this manner, one or more engines may operate as a multi fuel engine, for example, a dual fuel engine, and may be supplied with the second fuel without reducing an amount of storage for the first fuel. Moreover, the fuel tank may replace an operator cab in a rail vehicle already positioned in the consist, thereby reducing the need to replace a freight car with a tender car.

Figure 1:
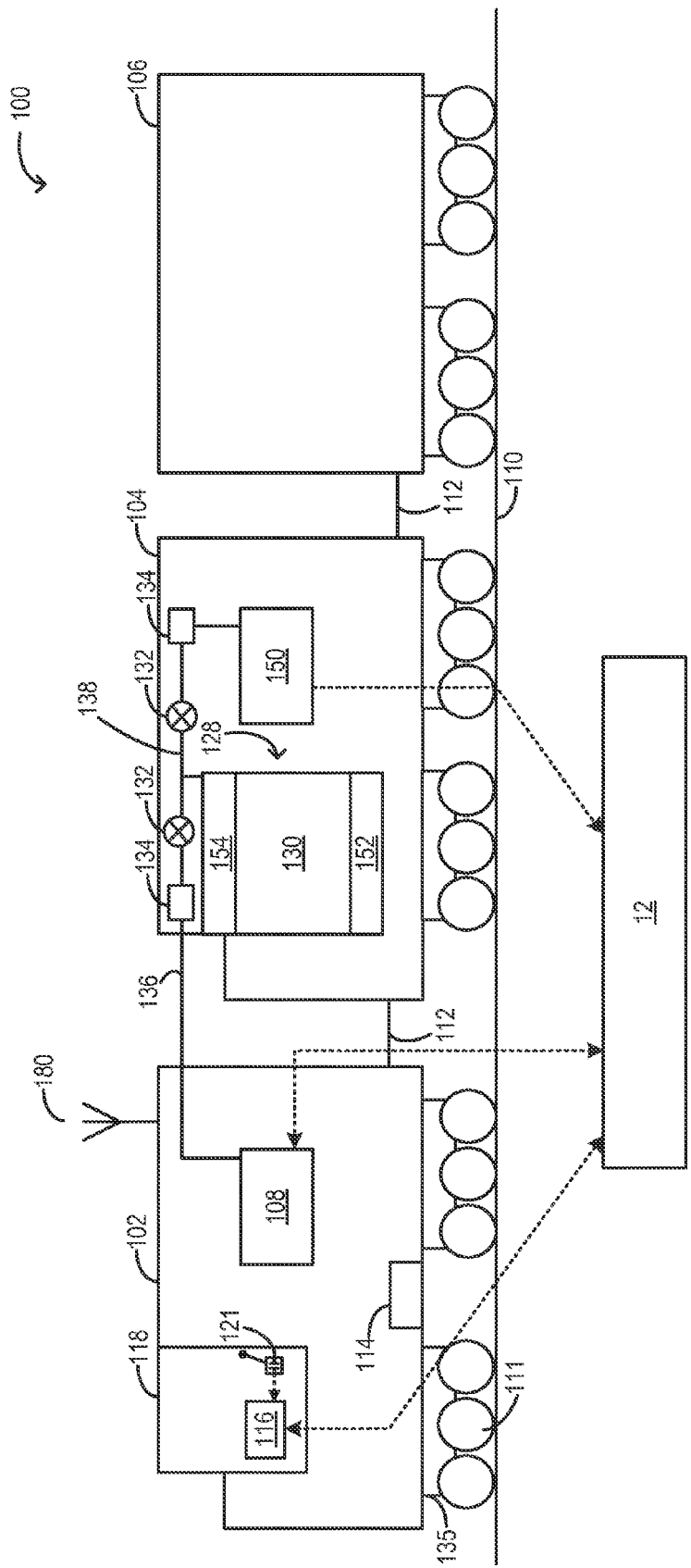
FIG. 1 shows a schematic diagram of a consist.

FIG. 1 shows an example of a vehicle system, depicted herein as a consist 100. (A consist, also referred to as a vehicle consist, is a group of vehicles that are mechanically linked to travel together along a route.) The consist 100 includes a second rail vehicle 102 (depicted herein as a locomotive), and a first rail vehicle 104 (depicted herein as a tandem rail car). The consist 100 may include one or more additional cars 106 (one additional car is depicted in the present example), such as freight cars. The second rail vehicle 102, the first rail vehicle 104, and the car 106 are configured to run on a track 110. In alternate embodiments, any appropriate number of locomotives and cars may be included in the consist 100.

The second rail vehicle 102 and the first rail vehicle 104 are powered for propulsion, while the car 106 is non-powered. A second engine system 108 is disposed in the second rail vehicle 102, the second engine system 108 comprising an engine with a plurality of cylinders. In the depicted example, the second rail vehicle 102 is configured as a locomotive powered by the second engine system 108 (described in greater detail below with reference to FIG. 2) that may operate with various fuels, such as a first fuel and a second fuel. Similarly, a first engine system 150 is disposed in the first rail vehicle 104, the first engine system 150 comprising an engine with a plurality of cylinders. In the depicted example, the first rail vehicle 104 is configured as a locomotive powered by the first engine system 150 (described in greater detail below with reference to FIG. 3) that may operate with various fuels, such as the first fuel and the second fuel. The fuels may include a liquid fuel, such as diesel fuel, an alternative fuel, and/or a gaseous fuel, or combinations thereof. In one example, the first fuel includes diesel fuel and the second fuel includes a gaseous fuel. Further, the gaseous fuel may be an alternative fuel, such as compressed natural gas (CNG), liquefied natural gas (LNG), and/or combinations thereof.

As used herein, gaseous fuel refers to a fuel that is gaseous at atmospheric conditions and/or upon injection into the engine intake or engine cylinder, but which may be stored and/or routed to the engine in liquid form (at a pressure above saturation pressure). For example, the gaseous fuel may be stored in liquid form, delivered to the engine fuel rail in liquid form, but then injected into an engine cylinder in gaseous form.

In some embodiments, the second rail vehicle 102 and/or the first rail vehicle 104 may be powered via alternate engine configurations, such as a gasoline engine, a biodiesel engine, a natural gas engine, or wayside (e.g., catenary, or third-rail) electric, for example. While the first and second engine systems 108 and 150 are configured in one embodiment herein as multi-fuel engines operating with diesel fuel and CNG/LNG, in alternate examples, the first and second engine systems 108 and 150 may use various combinations of fuels other than diesel and CNG/LNG.

The second rail vehicle 102 is mechanically coupled to the first rail vehicle 104 via a coupler 112. Likewise, the first rail vehicle 104 is mechanically coupled to the car 106 via another coupler 112. In this way, the second rail vehicle 102, the first rail vehicle 104, and the car 106 form a consist (e.g., the consist 100).

The first rail vehicle 104 comprises a fuel system 128 in place of a cab, the fuel system 128 including a fuel tank 130 for storing the second (gaseous) fuel. Each of the second rail vehicle 102 and the first rail vehicle 104 may include a second fuel tank (not shown in FIG. 1) for storing the first (liquid) fuel. In one example, where the vehicle system is a train (e.g., consist), the first rail vehicle 104 may be a tandem car mechanically coupled behind a lead locomotive. As elaborated below, the consist 100 further includes a first conduit 136 which forms a fuel delivery line linking the second rail vehicle 102 and the first rail vehicle 104 for transfer of the second, gaseous fuel from the first rail vehicle 104 to the second rail vehicle 102. The consist further includes a second conduit 138 which forms a delivery line from the fuel tank 130 to the engine system 150.

The fuel tank 130 is configured for storing the second fuel in either a liquid or gaseous state. As described in greater detail below with reference to FIG. 2, the second fuel may be a gaseous fuel stored in the fuel tank 130 at saturation pressure and the fuel system 128 may be configured as a liquid phase injection (LPI) system wherein the gaseous fuel is routed to an engine fuel rail at an elevated pressure relative to atmospheric pressure. In one example, the second fuel may be compressed natural gas fuel (CNG fuel) or liquefied petroleum gas fuel (LPG fuel). Herein, in the liquid phase injection system example, when stored at saturation pressure in the fuel tank 130 supported by the first rail vehicle 104, and while routed along a fuel line and fuel rail at high pressure, the fuel may be in liquid form (e.g., as LNG). However, when injected into the engine via the injectors into the cylinder at lower pressure (e.g., into a lower pressure (in comparison to rail pressure) fuel preparation area of the engine), the fuel may transition into a gaseous form and thus be injected in a gaseous state. By maintaining the fuel at higher pressure and in liquid form during at least a portion of the routing along the fuel line and into the fuel rail, metering of the fuel is facilitated. However, in other embodiments, the fuel rail may hold the fuel in a gaseous state.

In the embodiment depicted in FIG. 1, the fuel system 128 further includes a control system 152 for the fuel system 128. As shown, the control system 152 is in communication with a controller 12. The fuel system 128 further includes a heat exchanger, such as a vaporizer 154, which converts liquefied gas to a gaseous product.

Various fuel system components, such as various valves, pressure regulators, filters, and sensors, may be coupled in the fuel system 128 including one or more tank control valves 132 (two valves shown in the example of FIG. 1) which control entry of the second fuel from fuel tank 130 into first and second conduits 136 and 138 and filters 134 (two filters shown in the example of FIG. 1).

A vehicle control system, or a controller 12, may be configured to receive information from, and transmit signals to the second rail vehicle 102 and the first rail vehicle 104 of the consist 100. The controller 12 may receive signals from a variety of sensors on the consist 100 regarding engine and/or vehicle operating conditions, as elaborated herein, and may adjust vehicle and engine operations accordingly. For example, the controller 12 is operable to determine an amount of fuel to be injected to each engine cylinder from each of the multiple fuel sources. In one example, controller 12 may be in a local environment, such as on-board the second rail vehicle 102. However, in an alternate example, the controller 12 may be in a remote location, such as at a train dispatch center.

The second engine system 108 generates a torque that is used by an alternator (not shown in FIG. 1) to generate electricity for subsequent propagation of the consist 100. Traction motors (not shown in FIG. 1), mounted on a truck 135 below the second rail vehicle 102, provide tractive power for propulsion. In one example, as depicted herein, six inverter-traction motor pairs may be provided for each of six axle-wheel pairs 111 of the second rail vehicle 102. The fraction motors may also be configured to act as generators providing dynamic braking to brake the second rail vehicle 102. Air brakes 114 making use of compressed air may also be used by the second rail vehicle 102 for braking.

Operating crew and electronic components involved in vehicle systems control and management, such as an on-board diagnostics (OBD) system 116, may be housed within an operator cab 118 in the second rail vehicle 102. The OBD system 116 may be in communication with the controller 12, for example through wired communication (not shown) or wireless communication 180.

A vehicle operator may also indicate a desired vehicle power level by adjusting a power level setting of the vehicle engine. In one example, the operator can adjust a power level setting (thereby also controlling vehicle speed and torque demand) of the consist 100 by adjusting throttle and/or brake settings. For example, the second rail vehicle 102 may be configured with a stepped or "notched" throttle (not shown) with multiple throttle positions or "notches" including an idle notch corresponding to an idle engine operation and multiple power notches corresponding to progressively higher powered engine operation. The throttle may additionally have continuous dynamic braking notches for progressively higher braking demand. When in the idle power level setting (e.g., the idle notch position), the second engine system 108 may receive a reduced amount of total fuel from the multiple fuel sources enabling it to idle at a low RPM. Additionally, the traction motors may not be energized. To commence operation of the first vehicle, the operator may select a direction of travel by adjusting the position of a reverser 121 which can be placed in a forward, reverse, or neutral position. Upon placing the reverser 121 in either a forward or reverse direction, the operator may release brake 114 and move the throttle to a first lower power level setting (e.g., a first power notch) to energize the fraction motors. As the power level setting is increased (e.g., as the throttle is moved to higher power notches), a fuel rate and total amount of fuel delivered to the engine is increased, resulting in a corresponding increase in power output and vehicle speed.

The consist 100 may include various sensors for determining vehicle and engine operating conditions and communicating the same with OBD system 116 and/or controller 12. The various sensors may include track sensors (for providing an indication regarding track conditions such as track grade), location sensors (for providing an indication regarding a location of the train and geographical markers such as tunnels and bridges at or near the location of the train), various temperature and pressure sensors (for providing an indication regarding vehicle, engine, fuel tank, and ambient temperature and pressure conditions), particulate matter sensors (for providing an indication regarding a dust or soot level at the location of the train), etc. The controller 12 receives input data from the various sensors, processes the input data, and triggers various actuators in response to the processed input data based on instruction or code programmed therein corresponding to one or more routines. The various actuators may include fuel injectors, throttles, various valves (such as the control valves 132), various pressure regulators, etc.

In an embodiment, a rail vehicle comprises an elongate frame having a first long end and a distal, second long end. The rail vehicle further comprises a first engine positioned in a central location of the frame, the first engine configured to combust at least one of a first fuel or a second fuel, and a fuel tank configured to store the second fuel and positioned between the first engine and the first long end, wherein the rail vehicle does not include an operator cab.

In another embodiment, a rail vehicle comprises a first truck with a plurality of wheels and a second truck with a plurality of wheels, and a first engine disposed between innermost wheels of the first truck and the second truck, the first engine configured to combust at least one of a first fuel or a second fuel. The rail vehicle further comprises a fuel system disposed in a first region of the rail vehicle at a position above the first truck instead of an operator cab, the fuel system including a fuel tank for the second fuel and a conduit fluidly coupling the fuel tank to the first engine.

Figure 2:
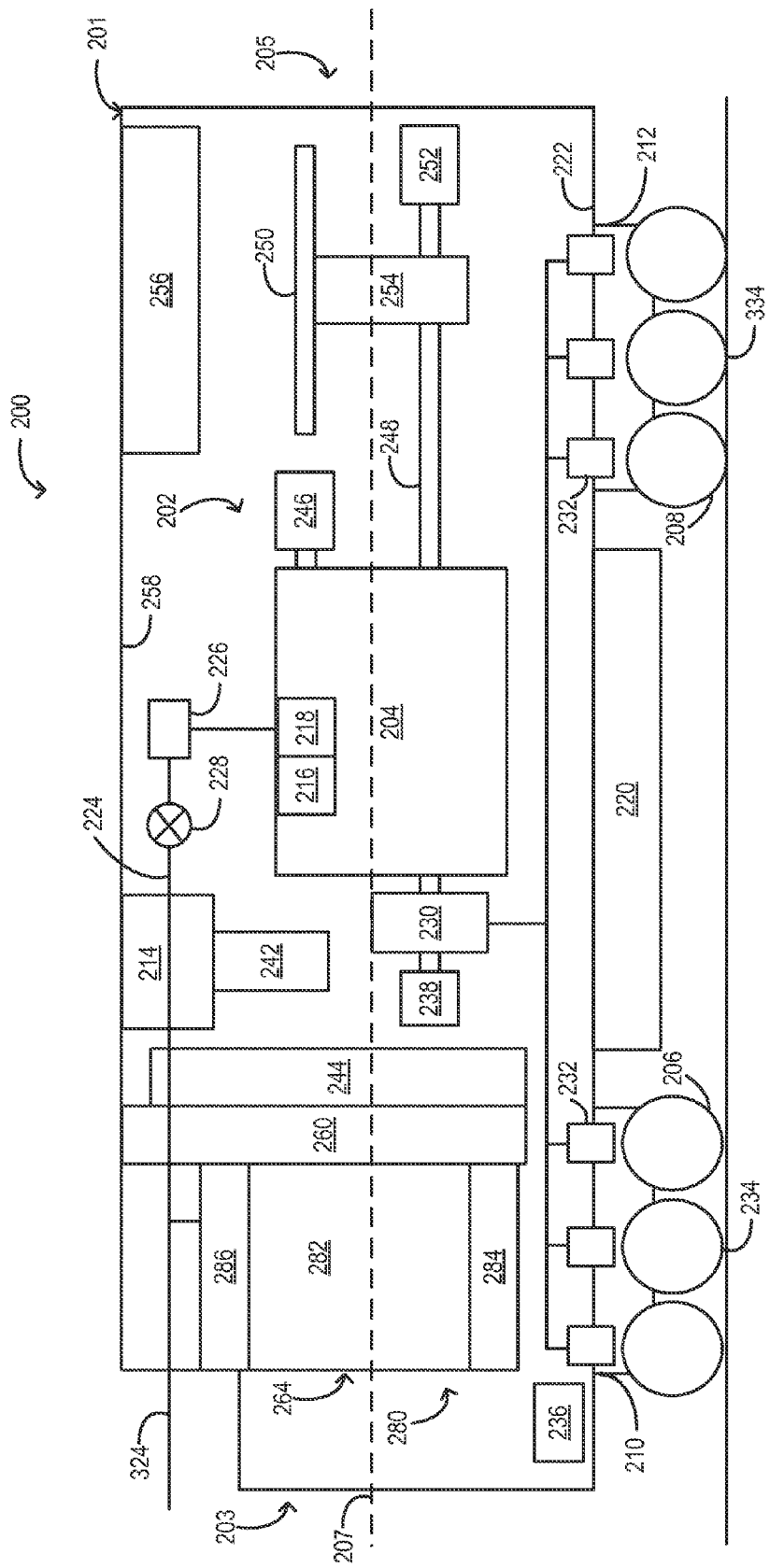
FIG. 2 shows a schematic diagram of a first rail vehicle of a consist.
Figure 3:
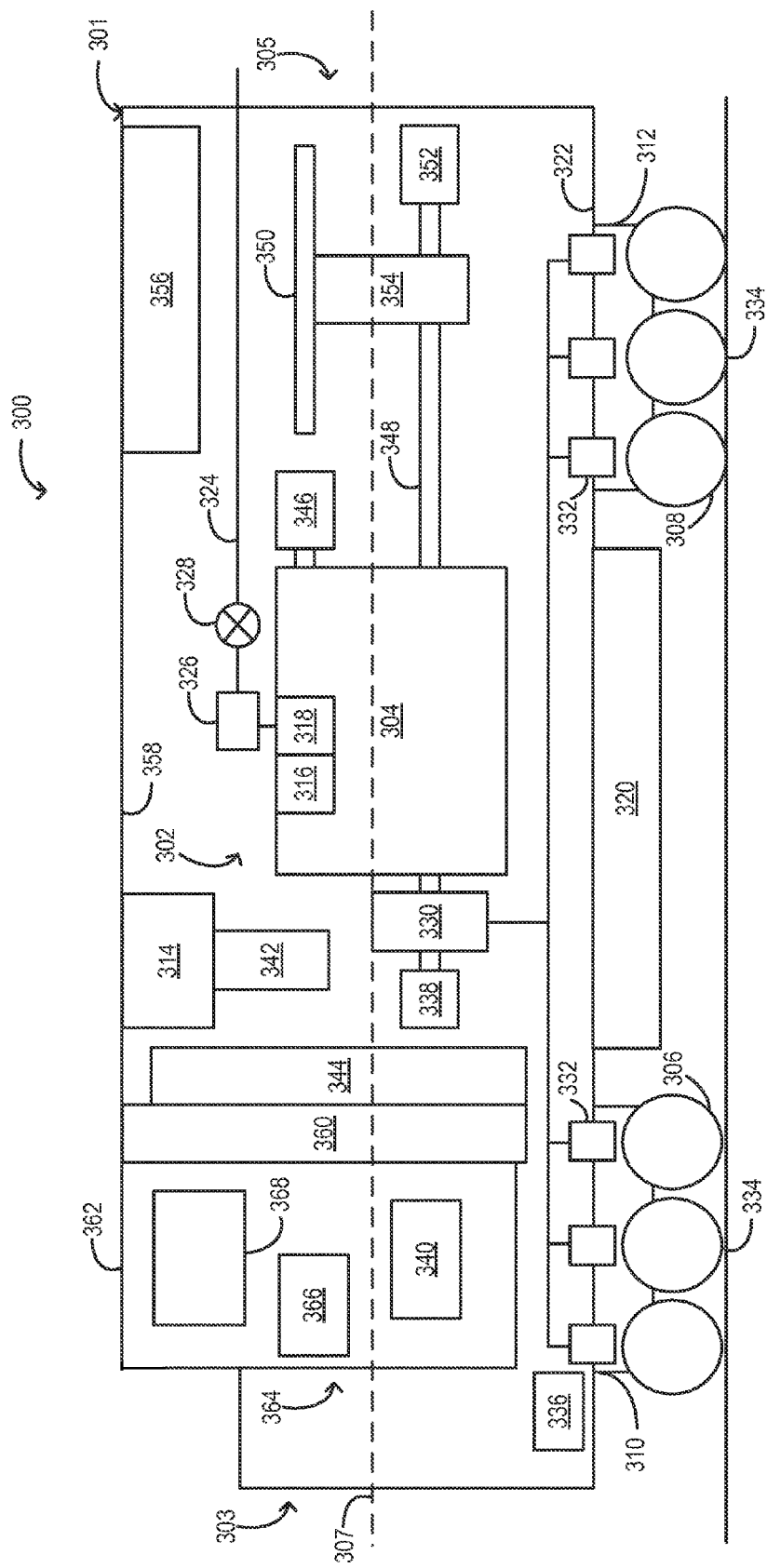
FIG. 3 shows a schematic diagram of a second rail vehicle of a consist.

FIGS. 2 and 3 show schematic diagrams illustrating embodiments of a first rail vehicle 200 and a second rail vehicle 300, respectively, such as the second rail vehicle 102 and the first rail vehicle 104 described above with reference to FIG. 1. While FIGS. 2 and 3 are schematic and not drawn to scale, it does show one example of the relative positioning of the various components with respect to one another. For example, relative positioning drawn in FIG. 2 of a first component vertically above a second component constitutes disclosure that the first component is vertically above the second component, where vertical represents toward the top of the page of FIG. 2 perpendicular to the longitudinal axis (207, as explained further below). Similarly, relative positioning drawn in FIG. 2 of a first component contiguous with a second component constitutes disclosure that the first component is contiguous with the second component. Further, relative positioning drawn in FIG. 2 of a first component positioned between a second component and a third component constitutes disclosure that the first component is positioned between the second and third components, etc.

The second rail vehicle 300 may be positioned directly in front of the first rail vehicle 200, for example, such that there are no locomotives or other cars between the first rail vehicle 200 and the second rail vehicle 300. Each of the first and second rail vehicles 200 and 300 include an engine system configured to propel the consist. The engine systems of each rail vehicle may communicate with one another via a control system, such as the controller 12 described above with reference to FIG. 1. Further, the second rail vehicle 300 includes an operator cab where a locomotive operator may sit, for example. In contrast, the first rail vehicle 200 does not include an operator cab and, instead, includes a fuel system with a fuel tank in place of the operator cab.

Continuing to FIG. 2, an engine system 202 positioned in the first rail vehicle 200 is shown. As one example, the engine system 202 may be the engine system 108 described above with reference to FIG. 1. The engine system 202 propels the rail vehicle 200, for example. The first rail vehicle 200 has an elongate frame 201 having a first long end 203 and a distal, second long end 205. Based on a direction of travel of the first rail vehicle 200, in some examples, the first end 203 may be a front end of the first rail vehicle 200 and the second end 205 may be a rear end of the first rail vehicle 200. In other examples, the first end 203 may be a rear end of the first rail vehicle 200 and the second end 205 may be a front end of the first rail vehicle 200.

The engine system 202 includes an engine 204 (e.g., a first engine) positioned in a central location of the rail vehicle 200. The central location may be within a range in a middle region of the rail vehicle 200 in a direction of a longitudinal axis 207 of the frame 201 extending between the first end 203 and the second end 205. As one example, the middle region may be between the first and second ends (203, 205, respectively) but not adjacent to the ends (203, 205). As another example, the range may be between innermost wheels 206 and 208 of a first truck 210 and a second truck 212, respectively. In another example, the range may be between the first end 203 and the second end 205, but positioned away therefrom with at least one other component between the engine and each of the ends, such as a fuel storage tank at one end, and a radiator fan at another end. Further, no part of the engine may not be positioned above (higher than) either of the engine trucks 210, 212, but yet the engine is positioned between the trucks 210, 212. As such, the engine may be positioned in a center of the rail vehicle 200 or may be positioned closer to one end or the other end of the rail vehicle 200 within the range. As described above, the engine 202 includes a plurality of cylinders, each cylinder including at least one intake valve and at least one exhaust valve.

The engine 204 receives intake air for combustion from an air intake 214. The air intake 214 draws ambient air in from outside of the rail vehicle 200, for example. The intake air may be filtered by an air filter (not shown). Exhaust gas resulting from combustion in the engine is supplied to an exhaust (not shown). The engine 204 may be configured to combust at least one of a first fuel and/or a second fuel. For example, the engine 204 may be a multi fuel engine. In one embodiment, the first fuel may be diesel and the second fuel may be LNG and/or CNG, for example. In one embodiment, the engine 204 may be configured to combust only the first fuel (e.g., diesel). In another embodiment, the engine 204 may be configured to combust only the second fuel (e.g., LNG and/or CNG). In yet another embodiment, the engine 204 may be configured to combust the first fuel and the second fuel (e.g., diesel and LNG and/or CNG). Thus, the engine 204 includes a first fuel injection system 216 for the first fuel and a second fuel injection system 218 for the second fuel. In some embodiments, the engine system 202 may include the first fuel injection system 216 for the first fuel and not the second fuel injection system 218 for the second fuel. In other embodiments, the engine system 202 may include the second fuel injection system 218 for the second fuel and not the first fuel injection system 216 for the first fuel.

The first fuel may be stored in a first fuel tank 220 positioned below the engine 204 and between the first truck 210 and the second truck 212 under a floor 222 of the rail vehicle 200. In some embodiments, an air reservoir configured to hold compressed air at a relatively high pressure may be mounted adjacent to the fuel tank 222. For example the air reservoir may be mounted on an opposite side of the fuel tank 220 such that it is not shown in FIG. 2. The compressed air may be utilized for braking, for example.

The second fuel may be stored in a second fuel tank 282. A conduit 224 is configured to route the second fuel from the fuel tank 282 to the second fuel injection system 218 for delivery to the engine 204. The conduit may be a tube, pipe, or other appropriate mechanism to route the second fuel from the fuel tank 282 to the fuel injection system 218. The conduit may be made of a material which can withstand fluctuations in temperature and pressure of the second fuel, for example. In some embodiments, the engine system 302 may not include the conduit 224, and the second fuel may be supplied only to the second engine 304 in the second rail vehicle 300.

For example, the engine system 202 may not include the conduit 224 when the engine 204 is configured to combust only the first fuel. A filter 226 is disposed in the conduit 224 to remove contaminants from the second fuel, for example. Further, a control valve 228 is disposed in the conduit 224 to control a flow of the second fuel to the second fuel injection system 218.

The fuel tank 282 and the conduit 224 are part of a fuel system 280, such as the fuel system 128 described above with reference to FIG. 1. The fuel tank 282 is disposed in a position 264 in place of the operator cab 262 shown in FIG. 2. For example, the first rail vehicle 200 does not include an operator cab. The position 264 is located between the first end 203 and the second end 205 of the first rail vehicle 200 along the longitudinal axis of the first rail vehicle 200, and, more specifically, between the engine 204 and the first end 203. In one embodiment, the fuel tank 282 is confined between a first location 1 meter from the first end 203 in a direction of the longitudinal axis 207 of the frame 201 and a second location 3 meters from the first end 203 in a direction of the longitudinal axis 201. In other embodiments, the fuel tank 282 may be closer to the first end 203 than 1 meter or farther away from the first end 203 than 3 meter. For example, the fuel tank 282 may be disposed at a position a distance W from the first end 203 and a distance Z from the first end, where Z>W.

The fuel system 280 further includes controls 284 for the fuel system 280. For example, the controls 284 may include a remote control system such that the fuel system 280 may be controlled remotely via another control system in the consist, such as a control system 360 disposed in the second rail vehicle 300 (shown in FIG. 3) or via a control center located remotely from the rail vehicle 200. A vaporizer 286 is further included in the fuel system 280. The vaporizer 286 is configured to convert liquid fuel from the fuel tank to a gaseous fuel, for example.

In this manner, the first rail vehicle 200 may operate as a tender car to store the second fuel while still providing power to propel the rail vehicle 200. As such, when the rail vehicle 200 is part of a consist, such as the consist 100 described above with reference to FIG. 1, a freight car does not have to be removed from the consist in order to carry the second fuel. Thus, the consist can carry the second fuel on long haul consist applications, for example, without needing to displace a revenue generating freight car.

Further, as depicted in FIG. 2, the engine system 202 includes an alternator 230 (e.g., a main alternator) which is mechanically coupled to the engine 204. For example, the engine 204 generates a torque output that is transmitted to the alternator 230. The alternator 230 produces electrical power that may be stored and applied for subsequent propagation to a variety of downstream electrical components. As an example, the alternator 230 may be electrically coupled to a plurality of traction motors 232 coupled to each of the wheels 234 of the first rail vehicle 200, and the alternator 230 may provide electrical power to the plurality of traction motors 232. The traction motors 232, mounted on the first and second trucks 210 and 212 below the first rail vehicle 200, provide tractive power for propulsion. Based on how the first rail vehicle 200 is coupled to the consist and whether the rail vehicle is operating in a forward or reverse direction, in some examples, the first truck 210 may be a front truck and the second truck 212 may be a rear truck. In other examples, the first truck 210 may be a rear truck and the second truck 212 may be a front truck.

In one example, as depicted herein, six inverter-traction motor pairs may be provided for each of six axle-wheel pairs 234 of the first rail vehicle 200. The traction motors 232 may also be configured to act as generators providing dynamic braking to brake the first rail vehicle 200. In particular, during dynamic braking, each traction motor 232 may provide torque in a direction that is opposite from the torque required to propel the first vehicle in the rolling direction thereby generating electricity. At least a portion of the generated electrical power may be routed to a system electrical energy storage device, such as a battery 236. The engine system 202 further includes an auxiliary alternator 238. The auxiliary alternator 238 may provide power to various components of the vehicle, such as lights, pumps, heating, ventilation, and air-conditioning (HVAC) system 240, and the like.

The engine system 202 further includes a motor blower 242 which is driven by the engine 204. The motor blower 242 is operable to provide air which is blown over the traction motors 232 to provide cooling during conditions such as high load. Output from the motor blower 242 may also provide cooling to the alternator 230. In some examples, the engine system 202 may include separate motor blowers for the traction motors 232 and the alternator 230.

The engine system 202 further includes a rectifier 244. As depicted, the alternator 230 and the auxiliary alternator 238 are positioned between the rectifier 244 and the engine 204 in the longitudinal direction 207 of the engine. The rectifier 244 is operable to convert AC output from the alternator 230 to DC output, for example.

As depicted in FIG. 2, the engine system 202 further includes a turbocharger 246 which is driven by exhaust gas from the engine 204. The turbocharger 246 increases air charge of ambient air drawn into an intake passage (not shown) in order to provide greater charge density during combustion to increase power output and/or engine-operating efficiency. The turbocharger 246 may be arranged between the intake passage and an exhaust passage (not shown), for example.

The engine 204 drives a crankshaft 248 which is mechanically coupled to the engine and to various components such as the alternator 230, the auxiliary alternator 238, a radiator fan 250, and a compressor 252. In this manner, output from the engine 204 transmitted to the alternator 230 and the auxiliary alternator 238 at one end of the engine 204 and to the radiator fan 250 and the compressor 252 at another end of the engine 204. The compressor 252 provides a supply of compressed air for the rail vehicle brakes, for example. As depicted, a gearbox 254 is positioned between the radiator fan 250 and the crankshaft 248. The gearbox 254 is configured to change a direction of drive upward toward the radiator fan 250 such that a radiator 256, which is positioned near a roof 258 of the first rail vehicle 200, may be cooled. The radiator 256 provides cooling to the engine 204 by circulating a cooling fluid, such as water or another suitable fluid, through the engine 204. The cooling fluid is cooled by the radiator fan 250 as it passes through the radiator 256, for example.

The engine system 202 further includes a control system 260 which is provided and configured to control various components related to the engine system 202. In one example, the control system 260 includes a computer control system. The control system 260 further includes non-transitory, computer readable storage media (not shown) including code for enabling on-board monitoring and control of engine operation. The control system 260, while overseeing control and management of the engine system 202, may be configured to receive signals from a variety of engine sensors in order to determine operating parameters and operating conditions, and correspondingly adjust various engine actuators to control operation of the engine system 202. For example, the control system 260 may receive signals from various engine sensors including, but not limited to, engine speed, engine load, boost pressure, ambient pressure, exhaust temperature, exhaust pressure, etc. Correspondingly, the control system may control the engine system 202 by sending commands to various components such as the alternator 230, the traction motors 232, the radiator fan 252, etc.

The control system 260 may be further operable to communicate with the controls 284 of the fuel system 280. In some embodiments, the control system 260 may be in communication with a control system 380 of the second rail vehicle 300. As such, the first rail vehicle 200 may receive signals from the second rail vehicle 300 (or another leading rail vehicle) and may adjust operation of the second engine 204 based on the operation of the first engine 304, for example.

FIG. 3 shows an engine system 302 positioned in the first rail vehicle 200. As one example, the engine system 302 may be the engine system 130 described above with reference to FIG. 1. The engine system 302 propels the rail vehicle 300, for example. The first rail vehicle 200 has an elongate frame 301 having a first long end 303 and a distal, second long end 305. Based on a direction of travel of the first rail vehicle 200, in some examples, the first end 203 may be a front end of the first rail vehicle 200 and the second end 305 may be a rear end of the first rail vehicle 200. In other examples, the first end 303 may be a rear end of the first rail vehicle 200 and the second end 305 may be a front end of the first rail vehicle 200.

The engine system 302 includes an engine 304 (e.g., a second engine) positioned in a central location of the rail vehicle 300. The central location may be a range in a middle of the rail vehicle 300 in a direction of a longitudinal axis 307 of the frame 301 extending between the first end 303 and the second end 305. For example, the range may be between innermost wheels 306 and 308 of a first truck 310 and a second truck 312. As such, the engine may be positioned in a center of the rail vehicle 300 or may be positioned closer to one end or the other end of the rail vehicle 300 within the range. As described above, the engine 304 includes a plurality of cylinders, each cylinder including at least one intake valve and at least one exhaust valve.

The engine 304 receives intake air for combustion from an air intake 314. The air intake 314 draws ambient air in from outside of the rail vehicle 300, for example. The intake air may be filtered by an air filter (not shown). Exhaust gas resulting from combustion in the engine is supplied to an exhaust (not shown). The engine 304 may be configured to combust at least one of a first fuel and a second fuel. For example, the engine 304 may be a multi fuel engine. In one embodiment, the first fuel may be diesel and the second fuel may be LNG and/or CNG, for example. In one embodiment, the engine 304 may be configured to combust only the first fuel (e.g., diesel). In another embodiment, the engine 304 may be configured to combust only the second fuel (e.g., LNG and/or CNG). In yet another embodiment, the engine 304 may be configured to combust the first fuel and the second fuel (e.g., diesel and LNG and/or CNG). Thus, the engine 304 includes a first fuel injection system 316 for the first fuel and a second fuel injection system 318 for the second fuel. In some embodiments, the engine system 302 may include the first fuel injection system 316 for the first fuel and not the second fuel injection system 218 for the second fuel. In other embodiments, the engine system 302 may include the second fuel injection system 318 for the second fuel and not the first fuel injection system 316 for the first fuel.

The first fuel may be stored in fuel tank 320 positioned below the engine 304 and between the first truck 310 and the second truck 312 under a floor 322 of the rail vehicle 300. In some embodiments, an air reservoir configured to hold compressed air at a relatively high pressure may be mounted adjacent to the fuel tank 322. For example the air reservoir may be mounted on an opposite side of the fuel tank 320 such that it is not shown in FIG. 3. The compressed air may be utilized for braking, for example.

The second fuel may be stored in a fuel tank 282 disposed in a first rail vehicle 200 (shown in FIG. 2), which may be directly coupled to the second rail vehicle 300. A conduit 324 is configured to route the second fuel from the fuel tank 282 to the second fuel injection system 318 for delivery to the engine 304. The conduit may be a tube, pipe, or other appropriate mechanism to route the second fuel from the fuel tank 282 to the fuel injection system 318. The conduit may be made of a material which can withstand fluctuations in temperature and pressure of the second fuel, for example. In some embodiments, the engine system 302 may not include the conduit 324. For example, the engine system 302 may not include the conduit 324 when the engine 304 is configured to combust only the first fuel. A filter 326 is disposed in the conduit 324 to remove contaminants from the second fuel, for example. Further, a control valve 328 is disposed in the conduit 324 to control a flow of the second fuel to the second fuel injection system 318.

Further, as depicted in FIG. 3, the engine system 302 includes an alternator 330 (e.g., a main alternator) which is mechanically coupled to the engine 304. For example, the engine 304 generates a torque output that is transmitted to the alternator 330. The alternator 330 produces electrical power that may be stored and applied for subsequent propagation to a variety of downstream electrical components. As an example, the alternator 330 may be electrically coupled to a plurality of traction motors 332 coupled to each of the wheels 334 of the second rail vehicle 300, and the alternator 330 may provide electrical power to the plurality of traction motors 332. The traction motors 332, mounted on the first and second trucks 310 and 312 below the second rail vehicle 300, provide tractive power for propulsion. Based on how the second rail vehicle 300 is coupled to the consist and whether the rail vehicle is operating in a forward or reverse direction, in some examples, the first truck 310 may be a front truck and the second truck 312 may be a rear truck. In other examples, the first truck 310 may be a rear truck and the second truck 312 may be a front truck.

In one example, as depicted herein, six inverter-traction motor pairs may be provided for each of six axle-wheel pairs 334 of the second rail vehicle 300. The traction motors 332 may also be configured to act as generators providing dynamic braking to brake the first second vehicle 300. In particular, during dynamic braking, each traction motor 332 may provide torque in a direction that is opposite from the torque required to propel the first vehicle in the rolling direction thereby generating electricity. At least a portion of the generated electrical power may be routed to a system electrical energy storage device, such as a battery 336. The engine system 302 further includes an auxiliary alternator 338. The auxiliary alternator 338 may provide power to various components of the vehicle, such as lights, pumps, and the like.

The engine system 302 further includes a motor blower 342 which is driven by the engine 304. The motor blower 342 is operable to provide air which is blown over the traction motors 332 to provide cooling during conditions such as high load. Output from the motor blower 342 may also provide cooling to the alternator 330. In some examples, the engine system 302 may include separate motor blowers for the traction motors 332 and the alternator 330.

The engine system 302 further includes a rectifier 344. As depicted, the alternator 330 and the auxiliary alternator 338 are positioned between the rectifier 344 and the engine 304 in the longitudinal direction 307 of the engine. The rectifier 344 is operable to convert AC output from the alternator 330 to DC output, for example.

As depicted in FIG. 3, the engine system 302 further includes a turbocharger 346 which is driven by exhaust gas from the engine 304. The turbocharger 346 increases air charge of ambient air drawn into an intake passage (not shown) in order to provide greater charge density during combustion to increase power output and/or engine-operating efficiency. The turbocharger 346 may be arranged between the intake passage and an exhaust passage (not shown), for example.

The engine 304 drives a crankshaft 348 which is mechanically coupled to the engine and to various components such as the alternator 330, the auxiliary alternator 338, a radiator fan 350, and a compressor 352. In this manner, output from the engine 304 transmitted to the alternator 330 and the auxiliary alternator 338 at one end of the engine 304 and to the radiator fan 350 and the compressor 352 at another end of the engine 304. The compressor 352 provides a supply of compressed air for the rail vehicle brakes, for example. As depicted, a gearbox 354 is positioned between the radiator fan 350 and the crankshaft 348. The gearbox 354 is configured to change a direction of drive upward toward the radiator fan 350 such that a radiator 356, which is positioned near a roof 358 of the rail vehicle 300, may be cooled. The radiator 356 provides cooling to the engine 304 by circulating a cooling fluid, such as water or another suitable fluid, through the engine 304. The cooling fluid is cooled by the radiator fan 350 as it passes through the radiator 356, for example.

The second rail vehicle 300 further includes an operator cab 362 at a position 364. An operator of the first rail vehicle may sit in the operator cab 362 during operation of the second rail vehicle 300, for example. The position 364 is located between the engine 304 and the first end 303 of the second rail vehicle 300 along the longitudinal axis of the second rail vehicle 300. In one example, the operator cab 362 may be a structure (e.g., interconnected walls, roof, and floor) that defines an interior, open space which has dimensions of at least 1.5 meters by 2 meters by 2.5 meters, or at least enough space to accommodate an adult human being. As described above, the operator cab 362 includes an on board diagnostics system 366 which may be in communication with the control system 360. As shown, the operator cab 362 includes one or more windows 368 such that the operator may see outside of the second rail vehicle 300. The operator cab 362 further includes a heating, ventilation, and air conditioning (HVAC) system 340 to regulate a temperature of the operator cab 362. In some examples, the HVAC system 340 may be fluidly coupled to a cooling circuit which includes the radiator 356.

The engine system 302 further includes a control system 360 which is provided and configured to control various components related to the engine system 302. In one example, the control system 360 includes a computer control system. The control system 360 further includes non-transitory, computer readable storage media (not shown) including code for enabling on-board monitoring and control of engine operation. The control system 360, while overseeing control and management of the engine system 302, may be configured to receive signals from a variety of engine sensors in order to determine operating parameters and operating conditions, and correspondingly adjust various engine actuators to control operation of the engine system 302. For example, the control system 360 may receive signals from various engine sensors including, but not limited to, engine speed, engine load, boost pressure, ambient pressure, exhaust temperature, exhaust pressure, etc. Correspondingly, the control system may control the engine system 302 by sending commands to various components such as the alternator 330, the traction motors 332, the radiator fan 352, etc.

In another embodiment, a rail vehicle comprises an elongate frame having a first long end and a distal, second long end. The rail vehicle further comprises a first engine positioned in a central location of the frame, the first engine configured to combust at least one of a first fuel or a second fuel. The rail vehicle further comprises a fuel tank configured to store the second fuel and positioned between the first engine and the first long end. The fuel tank is confined between a first location one meter from the first long end in a direction of a longitudinal axis of the frame and a second location three meters from the first long end in the direction of the longitudinal axis. The rail vehicle does not include an operator cab.

Other embodiments relate to manufacturing methods for a rail vehicle. In one embodiment of a method, the method comprises retrofitting an existing rail vehicle by removing at least part of an operator cab portion of the rail vehicle, and putting a fuel tank within the operator cab and/or in place of the part of the operator cab that was removed, in either case such that the operator cab is no longer operable for use as an operator cab for housing a human operator during use of the rail vehicle. The method may further comprise operably coupling the fuel tank to one or more systems on board the rail vehicle. In another embodiment, a method comprises revising an existing design of a rail vehicle, by removing an operator cab portion of the design and replacing the operator cab portion of the design with a fuel tank. The method further comprises manufacturing a rail vehicle according to the existing design that was revised, such that the resultant manufactured rail vehicle includes a fuel tank where the operator cab would have been placed according to the pre-revised design.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A rail vehicle, comprising:
a first engine positioned in a central location of the rail vehicle, the first engine configured to combust at least one of a first fuel or a second fuel; and
a fuel tank positioned in place of an operator cab, the fuel tank configured to store the second fuel, wherein the rail vehicle is a first rail vehicle configured to be coupled directly behind a second rail vehicle, and wherein the first engine includes a fuel injection system for the first fuel, and further comprising a conduit configured to route the second fuel from the fuel tank to a second engine in the second rail vehicle.

2. The rail vehicle of claim 1, further comprising a control system, and wherein the first engine and the second engine are in communication via the control system.

3. The rail vehicle of claim 1, wherein the rail vehicle includes a front truck and a rear truck and the fuel tank is positioned above the front truck, and wherein the central location is between innermost wheels of the front truck and the rear truck.

4. A vehicle consist, comprising:
a first rail vehicle without an operator cab at a position in the first rail vehicle, the first rail vehicle comprising a first engine and a fuel tank configured to hold a second fuel, the fuel tank positioned at a position in a second rail vehicle, and the first engine disposed behind the fuel tank and configured to combust at least one of a first fuel or the second fuel;
a second rail vehicle with an operator cab at the position, the second rail vehicle further having a second engine, the second engine positioned between the operator cab and an end of the second rail vehicle furthest away from the operator cab and configured to combust at least one of the first fuel or the second fuel; and
a conduit which fluidly couples the fuel tank in the first rail vehicle to at least one of the first engine or the second engine.

5. The vehicle consist of claim 4, wherein the operator cab comprises a structure that defines an interior, open space with dimensions of at least 1.5 meters by 2 meters by 2.5 meters.

6. The vehicle consist of claim 4, wherein the first engine includes a first fuel injection system for the first fuel and a second fuel injection system for the second fuel, and wherein the first fuel is diesel and the second fuel is liquefied natural gas.

7. The vehicle consist of claim 4, wherein the second engine includes a first fuel injection system for the first fuel and a second fuel injection system for the second fuel, and wherein the first fuel is diesel and the second fuel is liquefied natural gas.

8. The vehicle consist of claim 4, wherein the operator cab includes a heating, ventilation, and air conditioning system and at least one window.

9. The vehicle consist of claim 4, wherein the second rail vehicle includes a first truck and a second truck, and wherein the first engine is disposed in a central location between innermost wheels of the first truck and the second truck.

10. The vehicle consist of claim 4, wherein the first rail vehicle includes a front truck and a rear truck, and wherein the second engine is disposed in a central location between innermost wheels of the first truck and the second truck, and the fuel tank is positioned above the first truck.

11. A rail vehicle, comprising:
a first truck with a first plurality of wheels and a second truck with a second plurality of wheels;
a first engine disposed between innermost wheels of the first truck and the second truck, the first engine configured to combust at least one of a first fuel or a second fuel; and
a fuel system disposed in a first region of the rail vehicle at a position above the first truck instead of an operator cab, the fuel system including a fuel tank for the second fuel and a conduit fluidly coupling the fuel tank to the first engine,
wherein the rail vehicle is a first rail vehicle which is coupled directly to a second rail vehicle, and wherein the conduit is further configured to fluidly couple the fuel tank to a second engine in the second rail vehicle that is configured to combust at least one of the first fuel or the second fuel.

12. The rail vehicle of claim 11, wherein the second rail vehicle includes a position in which an operator cab is disposed and the first rail vehicle does not include an operator cab.

* * * * *